2 Sheets—Sheet 1.
J. BLANC.
PROCESS OF MANUFACTURING ROPE, TWINE, LINEN, &c.
No. 8,184. Patented June 24, 1851.
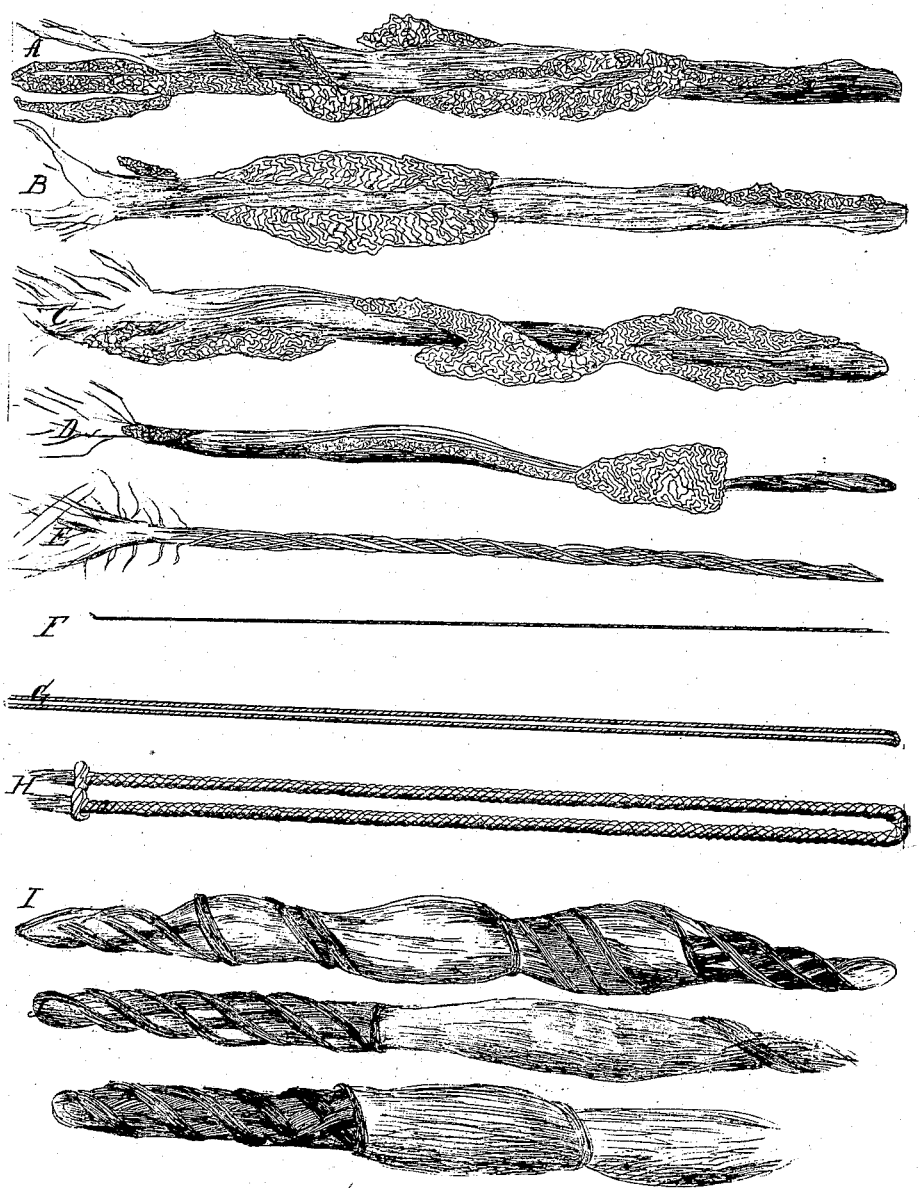

J. BLANC.
PROCESS OF MANUFACTURING ROPE, TWINE, LINEN, &c.
No. 8,184.  Patented June 24, 1851.
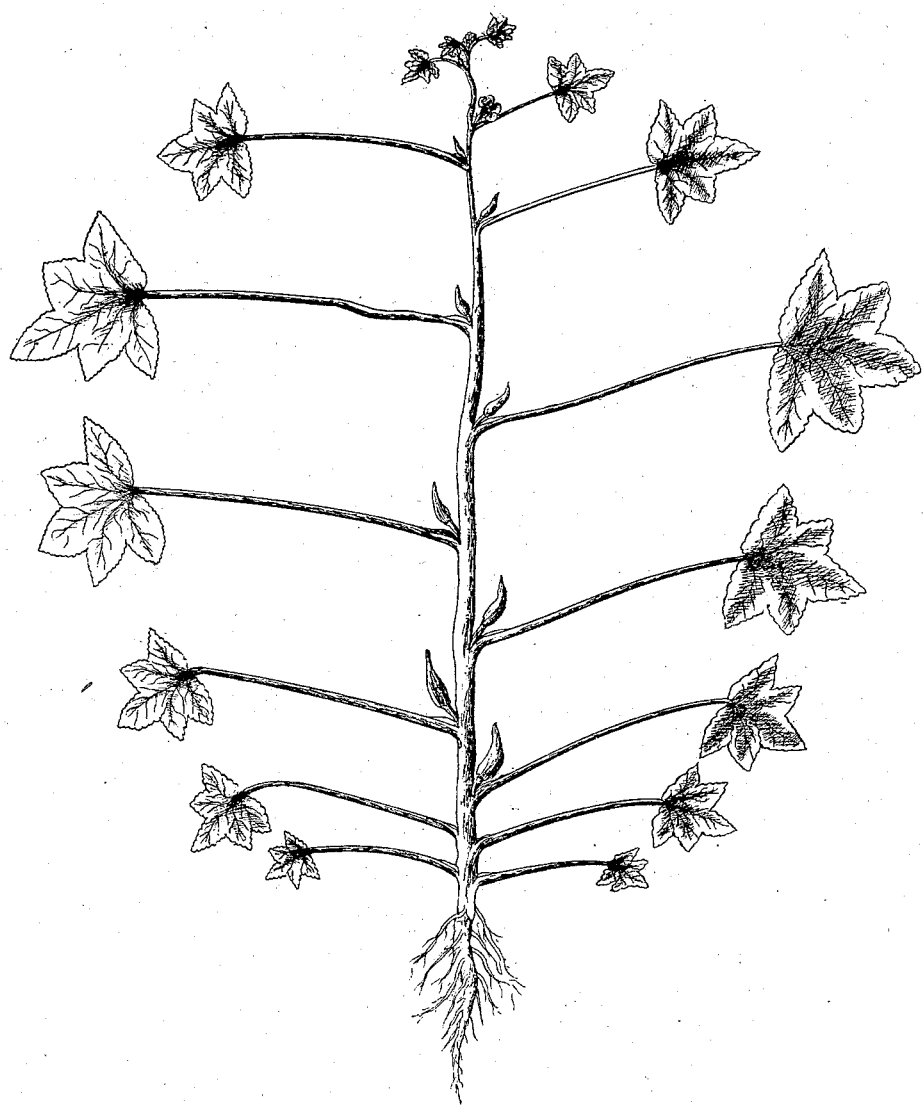

UNITED STATES PATENT OFFICE.

JEAN BLANC, OF NEW ORLEANS, LOUISIANA.

IMPROVEMENT IN MAKING HEMP FROM OKRA.

Specification forming part of Letters Patent No. 8,184, dated June 24, 1851.

*To all whom it may concern:*

Be it known that I, JEAN BLANC, of New Orleans, in the parish of Orleans and State of Louisiana, have discovered a most valuable article of hemp in the bark of the okra-plant, and also a method by which to clean and prepare it for use; and I do hereby declare that the following is a full and exact description thereof, reference being had to the drawings of the okra-plant deposited in the Patent Office.

The discovery which I have made consists in a new method of preparing hemp from the bark of the okra-plant by grinding or washing the plant while in its green state and rotting the bark in water, thereby dissolving the glutinous matter which it contains, and afterward washing it in water before drying. The okra-stalk, when green, must be passed between a set of rollers for the purpose of washing the stalk, and then thrown into a reservoir of water, in which it must remain from three to five days, according to the temperature of the water. This reservoir must be constructed with a floor of plank, and with sides so formed as to allow the water to be let on and off at pleasure by means of gates during the process of cleansing. The cleansing is effected by passing a large wooden roller over the stalks when mashed, to disengage the woody portion of the stalks from the bark, and also to express the glutinous substance from the fibrous portion at the same time, renewing the water as often as is found necessary, until the fibers are freed from all impurities. It is then taken from the reservoir and spread in the sun to dry.

What I claim as my invention, and desire to secure by Letters Patent, is—

The preparing of hemp from the bark of the okra-plant in its green state, and the herein-described method of preparing it for use.

JEAN BLANC.

Witnesses:
SAML. L. GREEN,
A. W. LANG.